United States Patent Office.

JAMES T. STEWART, OF PEORIA, ILLINOIS, ASSIGNOR TO SAMUEL R. WHITLOW.

Letters Patent No. 103,675, dated May 31, 1870.

IMPROVED MEDICAL COMPOUND.

The Schedule referred to in these Letters Patent and making part of the same.

*To all whom it may concern:*

Be it known that I, JAMES T. STEWART, of the city of Peoria, in the county of Peoria and in the State of Illinois, have invented an Improved Tonic Medicine or Compound, useful as an invigorator for the stomach, blood-purifier, stimulant, and anti-malaria tonic; and do hereby declare that the following is a full, clear, and exact description of the ingredients forming the compound, the quantities of each, and the manner of compounding, making, and using the same.

The ingredients and their respective quantities are:

Tincture of orris-root, four ounces, weight; tincture of calamus, eleven drams; tincture of asarum canadensis, four ounces; tincture of gentian, four ounces; white sugar, six ounces; orange-flower water, four ounces; proof whiskey, one gallon; water, half a gallon. To which may be added, for coloring the medicine, caramel, eight ounces, more or less, according to the depth of color desired.

Mix the above tinctures together, then add the whiskey and the water; then the caramel, until the desired color is attained. It is then ready to bottle up.

The dose is a wine-glass full three times a day, before or after meals.

Having thus described my invention,

What I claim is—

The medical compound, prepared of the ingredients, and in the proportions and manner, and to be used, substantially as described.

In testimony that I claim the foregoing tonic medicine or compound, I have hereunto set my hand this 13th day of April, 1870.

JAMES T. STEWART.

Witnesses:
WILLIAM JACK,
JOHN CALVERT.